Figure 7:
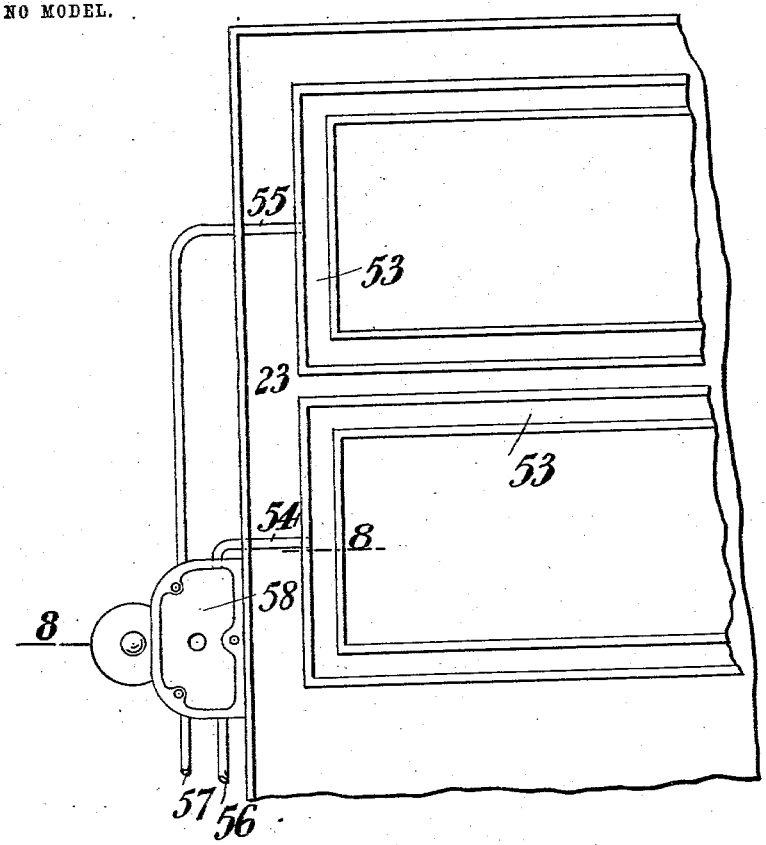

No. 757,475. PATENTED APR. 19, 1904.
J. ST. P. MACARDLE.
AIR PURIFIER.
APPLICATION FILED NOV. 2, 1903.
NO MODEL. 5 SHEETS—SHEET 1.
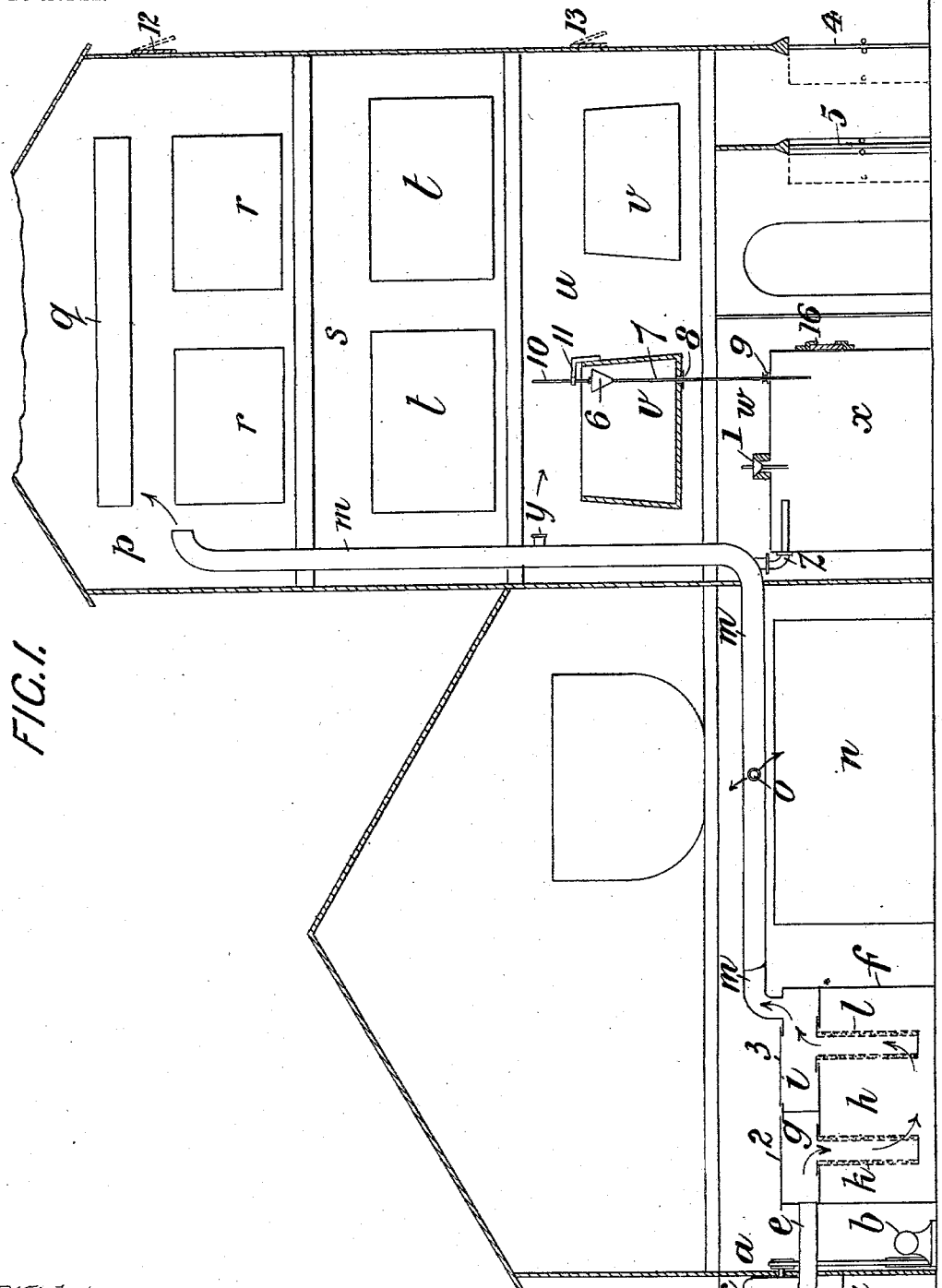

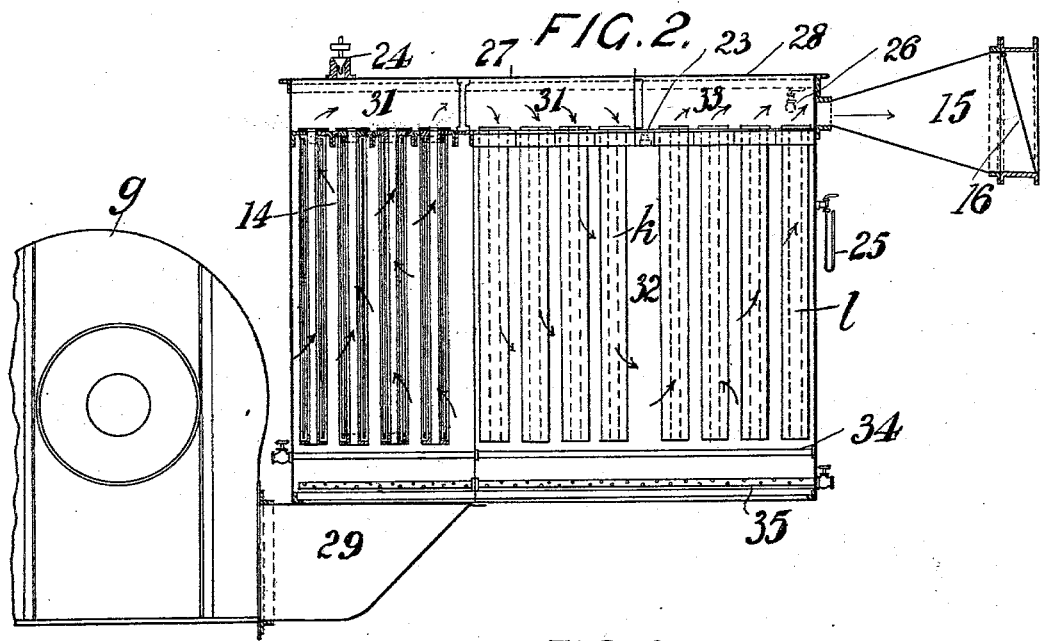
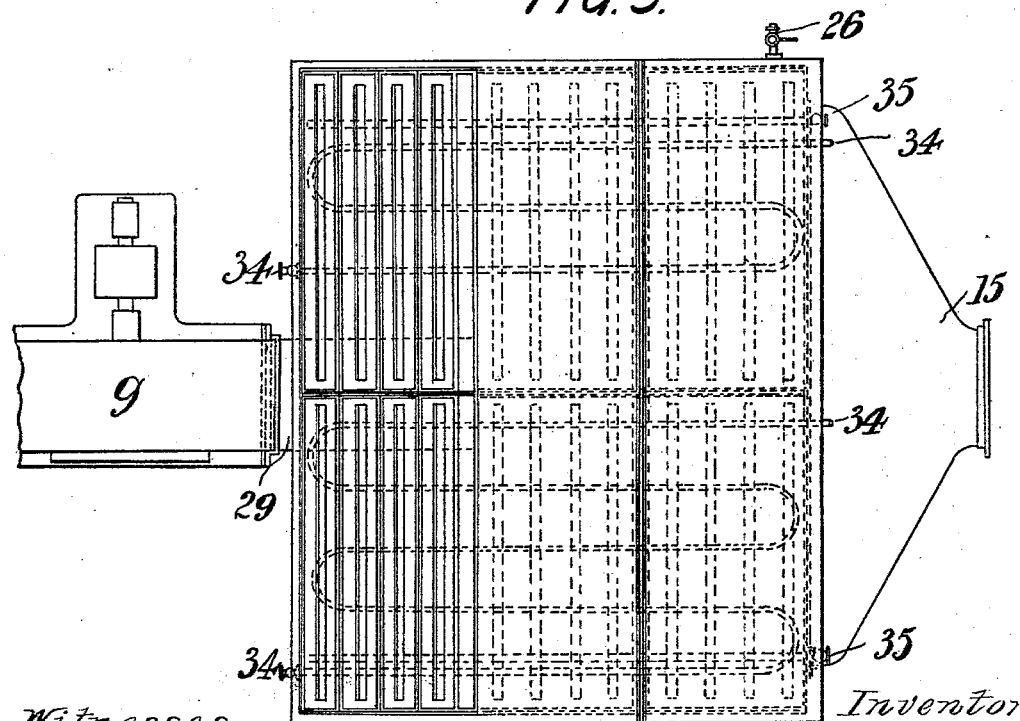

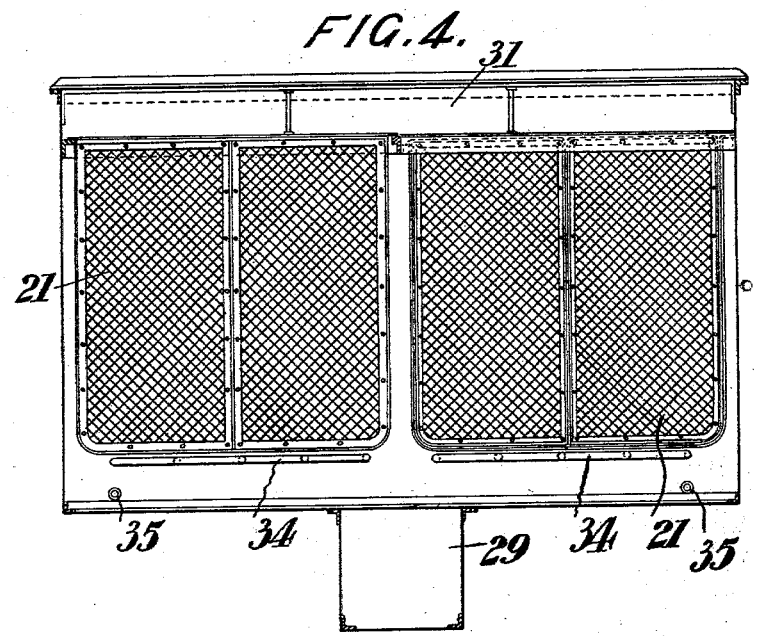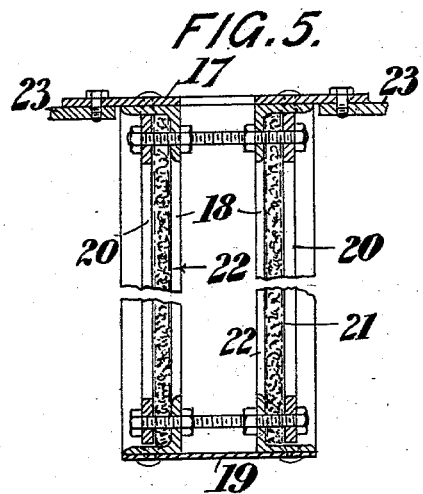

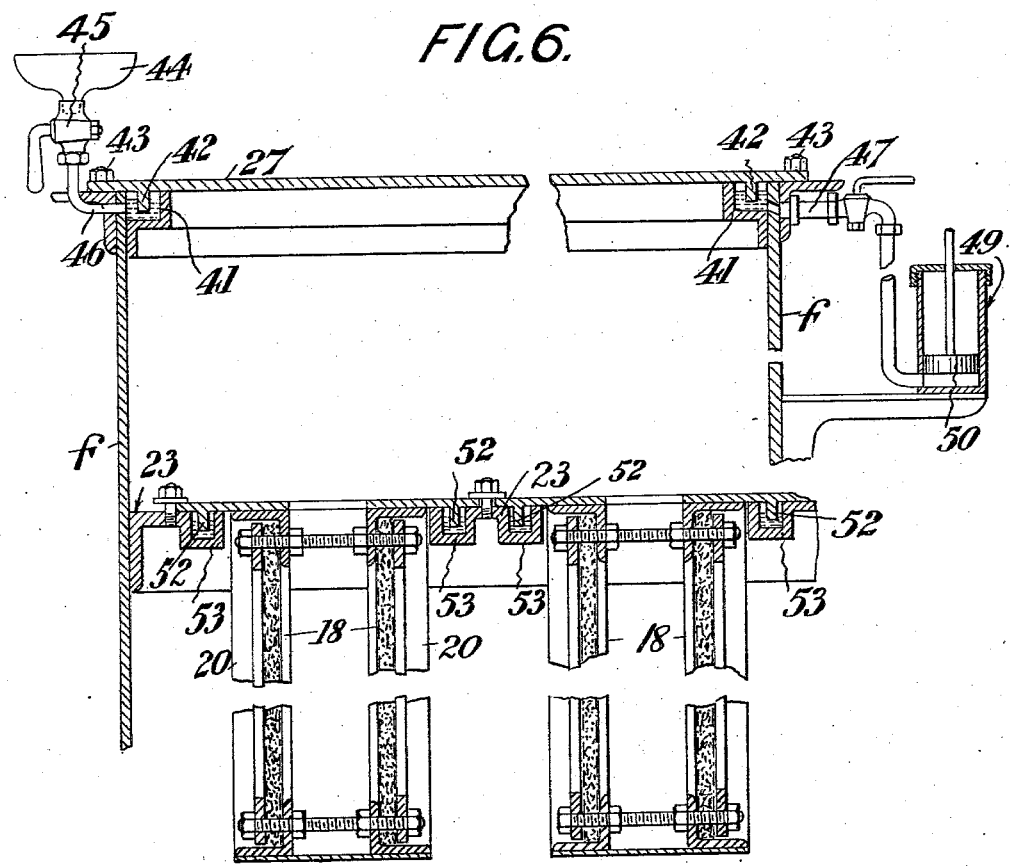

No. 757,475. PATENTED APR. 19, 1904.
J. ST. P. MACARDLE.
AIR PURIFIER.
APPLICATION FILED NOV. 2, 1903.
NO MODEL. 5 SHEETS—SHEET 5.

Witnesses.
Harry L. Amer.
Inventor:
John St. Patrick Macardle.

No. 757,475. Patented April 19, 1904.

UNITED STATES PATENT OFFICE.

JOHN ST. PATRICK MACARDLE, OF DUNDALK, IRELAND.

AIR-PURIFIER.

SPECIFICATION forming part of Letters Patent No. 757,475, dated April 19, 1904.

Application filed November 2, 1903. Serial No. 179,580. (No model.)

*To all whom it may concern:*

Be it known that I, JOHN ST. PATRICK MACARDLE, gentleman, a subject of the King of Great Britain and Ireland, residing at Cambricville, Dundalk, county Louth, Ireland, have invented new and useful Improvements in Air-Purifiers, of which the following is a specification.

This invention relates to improvements in apparatus for the purification of air supplied to breweries, maltings, hospitals, theaters, and other places and in connection with brewing.

It has principally for object to prevent the development of wild and secondary yeasts and bacterial contamination (whether the bacteria be undeveloped or developed) in the brewing of such liquors as, for instance, ale and porter.

The chief cause accounting for the development of foreign yeasts or organisms in beer (commonly termed "wild" and "diseased" species) may be credited not only to the overexposure of "cooler" wort to the atmosphere at dangerous temperatures—that is, to an atmosphere exceedingly variable in condition—but also to the modern plan of running this wort in the form of fine films over refrigerators and to the system of repeatedly replanting an infected store-yeast in collected wort, so that the wild and other species steadily become widely spread and increasingly developed. Now I have discovered that it is possible to entirely prevent the appearance and development of either secondary types of yeast or bacteria or their germs, and thus to keep the store-yeast of the brewing to a standard of true (as distinct from "commercial") purity by utilizing perfectly pure or sterilized air in or in contact with the hop-back, cooling, refrigerating, and yeast - storage rooms and, finally and preferably, also in the actual fermenting department. It is therefore of the greatest importance to keep the air of the brewery and other buildings as pure as possible, or at least the air which can come into contact with the yeast, wort, and beer, and for this reason means are provided for filtering all the air which passes into the buildings containing, say, the hop-back, the cooler, the refrigerator, the fermenting-tuns, and the yeast-storage, or if the cubic contents of the buildings be too great to be kept supplied with pure or sterilized air it follows that pure air may be supplied to the various apparatus or the chambers containing them. The air, which is first filtered or purified, is forced or drawn into the building by means of a fan or otherwise. The fan is driven at a great speed by an engine or motor of any kind, which fan draws or forces air through a filter consisting of a number of frames covered or packed with cotton-wool or other suitable material, which give a very large surface for the air, and consequently the power required to drive the fan is relatively small. All the air entering the building or the several departments or apparatus mentioned passes through the filter, and the excess of air escapes or passes away through louvers, valves, or ventilators, which may be more or less closed, so that there is a greater pressure of air in the building or buildings than outside.

As applied to buildings generally the proper and effective filtration of the air supplied prevents the admission of harmful germs and other organisms.

Figure 8:
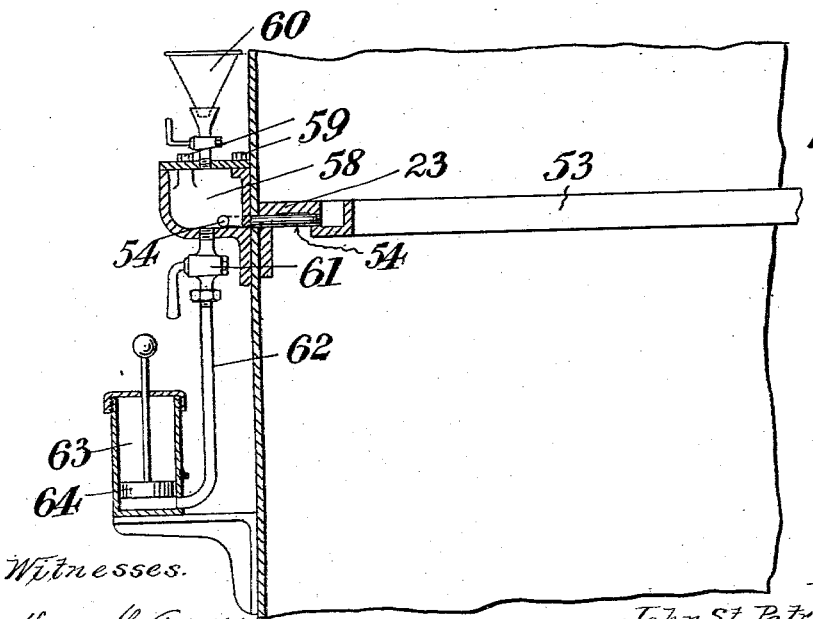

Figure 1 of the accompanying drawings illustrates, more or less diagrammatically, in sectional elevation a brewery provided with means for filtering or purifying the air constructed according to this invention. Fig. 2 is a view, partly in elevation and partly in section, of a modified form of filter. Fig. 3 is a plan thereof with one of the covers removed. Fig. 4 is a transverse section, and Fig. 5 is a detail in sectional elevation, of a frame to an enlarged scale. Fig. 6 is a sectional elevation of a filter in which the joints between the cover and the casing and between the filter-frames and the partition are made by improved means as compared with the ordinary bolts and nuts. Fig. 7 is a plan with the filter-frames removed; and Fig. 8 is a vertical section on the line 8 8, Fig. 7.

Referring to Fig. 1, the fan $a$, driven by the engine or motor $b$, is mounted in a skeleton box or case $c$, provided with a covering of cotton-wool $d$, which acts as a strainer and stops the dirt and many other impurities from entering the fan-case $c$. The delivery-pipe $e$ of the fan is connected to a large inclosed casing $f$, which is divided into three compartments $g$, $h$, and $i$, into the former of which the air is delivered by the fan. The bottom of the said compartment $g$ is provided with a number of narrow rectangular slots—say three or more—and fitting into these slots to a corresponding number are some rectangular open-work frames, of which only one is shown for the sake of clearness. These frames, such as $k$, are open above to the chamber $g$, and where they project into the compartment $h$ they are covered or packed with cotton-wool, so that air passes from the compartment $g$ through the filters $k$ into the compartment $h$. In the chamber $i$ there is also a number of other filters, $l$, and the latter are, like that marked $k$, open above to the chamber $i$ and covered or packed with cotton-wool where they project into the chamber $h$. The filters $l$, (of which only one is shown,) forming the second group of filters, are so mounted that air passes through them from their exteriors into their interiors, which are in connection with the third compartment $i$. This third compartment is connected by an outlet or pipe $m$ with the interior of the building, and the purified air passes into the latter. The casing $f$ is suitably provided with air-tight covers 2 and 3 for the removal and replacement of the filters $k$ and $l$, and the latter are suitably provided with flanges and packing, so as to make air-tight joints when bolted into place in the slots in the bottoms of the compartments $g$ and $i$. In the example shown the purified air passes into the chamber containing the hop-back $n$ by the outlet $o$. The pipe $m$ passes up as far as the refrigerator-room $p$, containing the cooler $q$ and refrigerators $r$, where it supplies the purified air. The pipe $m$ also may have outlets to all the other rooms in the building where purified air is advisable—such as to the room $s$, containing the mash-tuns $t$, the chamber $u$, containing the fermenting vessels $v$, and the room $w$, containing the yeast-store $x$; but in practice it is sufficient if the filtered-air pipe $m$ has an outlet $y$ to the fermenting-room $u$ and a pipe $z$ passing into the interior of the yeast-store, from which excess of air may pass away by a valve or ventilator 1, which lifts or opens when a certain pressure of air is obtained, but which prevents the ingress of unpurified air, the yeast passing from the fermenting vessel $v$ to the yeast-store $x$ by means of a funnel 6, the spout or pipe 7 of which passes through a stuffing-box 8 in the fermenting vessel and a stuffing-box 9 in the cover of the yeast-store $x$, which funnel is provided with a rod 10, which permits the funnel to be raised or lowered, the rod being suitably guided and held by friction or other means at any height in a bracket 11. The yeast-store is also suitably provided with a peep hole or window 16 for ascertaining the level of the contents.

In order to prevent the ingress of air through the doors or entrances to the building, there is a sort of air-lock at each entrance entirely closed in, and double doors 4 and 5 are suitably provided which may, if desired, be so arranged by connecting mechanism of any suitable construction that it is impossible for both doors to be open at the same time.

The excess of air escapes by means of ventilators or louvers or flap-valves, such as those marked 12 and 13, in the refrigerator-rooms and fermenting-rooms, respectively, and a certain amount is sure to escape through the doors and elsewhere.

The construction of filter shown in detail in Figs. 2, 3, 4, and 5 is very similar to that described with reference to Fig. 1, except that it has three sets or groups of filters and the first group 14 serves as a preliminary filter or strainer for the air which passes direct from outside the building to the fan $g$ and from the fan to the second group of filters $k$, thence the air passing to the third group $l$, and finally after passing through them escapes by the discharge-opening 15 past the valve 16, which is to prevent the ingress of air and dirt to the filters if the fan should not be running. Fig. 5 illustrates a convenient way of making these filters, and from that figure particularly it will be seen that, as aforesaid, the filter-frames are mounted on flanges 17, having holes in same, to which flanges are riveted the inside skeleton or open frames 18, which are closed at the bottom and sides by the plates 19 riveted thereto. Outside of the inner frames 18 are bolted outer open or skeleton frames 20, leaving a space in between. The inside of the outer frames 20 and the outside of the inner frames 18 are provided (see also Fig. 4) with sheets of wire netting or gauze, (marked 21 and 22, respectively,) and the cotton, wool, or other filtering material occupies the intermediate space. All the filter-frames are bolted to the slotted partition 23, and the casing is, as in the previous example, provided with air-tight covers 27 and 28, Fig. 2, so as to allow of removal for examination or renewal of the filters. The filter-casing is suitably provided with a safety or relief valve 24 for relieving the pressure as soon as the valve 16 has been closed and just before the fan is stopped, a pressure-gage 25, Fig. 2, for ascertaining the pressure of air at the delivery end of the casing, and a cock 26 for permitting of drawing off air to test its purity. The fan $g$ delivers air through its discharge-trunk 29 to the chamber 30. The air passes through the filters 14 from the outside to the inside and thence to the chamber 31. From the latter the air passes from the inside to the outside of the filters $k$ into the chamber 32 and from the outside to the inside of the filters $l$ to the chamber 33 and thence to the discharge-trunk 15 into the building or by pipes to certain of the rooms therein. Hot air or steam or cold air may be supplied to the filter by a jacket surrounding the casing, or there may be a pipe or coil 34 inside for that purpose. The filters may also, if desired, be purified or sterilized by means of a perforated steam pipe or coil 35.

Referring to Fig. 6, the casing *f* of the filter is provided with a gutter 41 all round the top, and the cover 27 is provided with a spigot-like rim or flange 42, which takes into the said gutter 41. The cover 27 is held in place by two or more studs and nuts 43 or by clamps of any approved construction; but an airtight joint is made by running quicksilver or other liquid of a high specific gravity into the said gutter 41 by means, for example, of a funnel 44, preferably provided with a cock 45 and a bent pipe 46, or the funnel may be connected to the cover and the lower end or pipe thereof may pass through the cover, and thus communicate with the gutter. In order to prevent the mercury from splashing over out of the gutter when removing or replacing the cover, the gutter has preferably an exit-pipe 47, provided with a cock 48, and the mercury is then either drawn off and allowed to fall into a bottle or other receptacle ready to be poured into the funnel again, when the cover is replaced, or the exit-pipe 47 may communicate with a cylinder 39, provided with a piston 50, mounted on a bracket 51 or elsewhere, so that when the piston 50 is raised and the cock 48 opened the mercury passes into the cylinder, leaving the gutter 31 empty, whereupon the cover may be removed without danger of losing any of the mercury. When the cover has beeen replaced, the piston 50 is forced down and the mercury is caused to flow from the cylinder 49 up through the pipe 47 into the gutter 41 until it surrounds the flange 32 and more or less fills the gutter 41.

The filter-frames 18 20, as shown in Figs. 6, 7, and 8, are also provided with flanges 52 similar to those already described and marked 42, and the said flanges 52 dip into gutters 53, secured to or made in one within the slotted partition 23, which gutters are, as shown in Figs. 7 and 8, connected by pipes 54, 55, 56, and 57 (one for each gutter) to an inclosed receptacle 58, having a cock 59 and a funnel 60, or the receptacle may also be connected by a cock 61 and pipe 62 to a cylinder 63, having a piston 64, the action of which is as described with reference to the cylinder 49 in Fig. 6.

By the employment of filters of the aforesaid constructions a very large filtering area is produced in a small space and the fan or other apparatus can force a large amount of air with the expenditure of a small amount of motive power, foul air can be purified to any desired degree by increasing the thickness of the filtering media, and it is very easy to renew the filters.

Although the invention is only illustrated as applied to the purification of the air in a brewery, it is evident that the apparatus for filtering may be employed equally well for the purification of air to be supplied to hospitals, churches, theaters, and other large buildings or places.

What I claim as my invention, and desire to secure by Letters Patent, is—

1. Apparatus for filtering and purifying air comprising a casing divided into compartments, hollow filtering elements in each compartment, means to force the air in one direction through the elements in one compartment and through the elements in the next compartment in another direction, substantially as set forth.

2. Apparatus for filtering or purifying air supplied to a brewery or other building comprising a fan, a casing divided into compartments, a horizontal partition having a number of slots, a number of open or skeleton inner frames, a number of open or skeleton outer frames, filtering material intermediate the outer and inner frames and flanges attached to the said frames, said flanges being adapted to be attached to the said partition so that the interiors of the filter-frames are open to one compartment in the casing and the exteriors of the said filter-frames are within another compartment in the casing substantially as described and shown.

3. Apparatus for filtering or purifying air supplied to a brewery or other building comprising a fan, a casing divided into compartments, a horizontal partition having a plurality of slots, a gutter surrounding each of the said slots, filled with liquid, filter-frames consisting of a plurality of open or skeleton outer frames, a plurality of open or skeleton inner frames, filtering material intermediate the said outer and inner frames and a vertical flange surrounding each filter-frame adapted to dip into the said gutters and to make a seal, a cover for the said casing, means for fixing the said filter-frames to the partition in such manner that the interiors of the filter-frames are open to one compartment in the casing and the exteriors of the said filter-frames are within another compartment and means for fixing the said cover to the casing substantially as set forth.

4. Apparatus for filtering or purifying air supplied to a brewery or other building comprising a fan, a casing divided into four compartments, a horizontal partition dividing the two upper from the two lower compartments the first compartment being in connection with the fan and the last compartment opening to the place to be supplied with purified air, a plurality of slots in said partition, a gutter surrounding each of the said slots filled with liquid to form a seal a gutter surrounding the top of the said casing and containing liquid, filter-frames so arranged that the interiors of the said frames are open to one compartment in the casing and the exteriors thereof are within another compartment in the casing such frames consisting of a plurality of open or skeleton outer frames, a plurality of open or skeleton inner frames, filtering material intermediate the said outer and inner frames and a vertical flange surrounding each filter-frame adapted to dip into the said gutters surrounding the said slots and to make a seal, means for fixing the said filter-frames to the partition, a pipe or coil for supplying hot air or steam or cold air, a perforated pipe or coil for supplying steam for sterilizing purposes, a cover for the said casing, a vertical flange depending from the said cover and adapted to form a seal with the liquid in the gutter surrounding the casing and means for securing the cover to the casing substantially as set forth.

5. Apparatus for filtering or purifying air supplied to a brewery or other building comprising a fan, a casing divided into four compartments, a horizontal partition dividing the two upper from the two lower compartments, the first compartment being in connection with the fan and the last compartment opening to the place to be supplied with purified air, a valve to close said opening when the fan is not working, a gutter surrounding the top of the said casing and containing liquid, a plurality of slots in said partition, a gutter surrounding each of the said slots and containing liquid, filter-frames so arranged that their interiors are open to one compartment and their exteriors are within another compartment in the said casing, such frames consisting of a plurality of open or skeleton outer frames, a plurality of open or skeleton inner frames, filtering material intermediate the said outer and inner frames and a vertical flange surrounding each filter-frame adapted to dip into the said gutters surrounding the slots and to make a seal, means for fixing the said filter-frames to the partition, a pipe or coil for supplying hot air or steam or cold air, a perforated pipe or coil for supplying steam for sterilizing purposes, a cover for the said casing a vertical flange depending from the said cover and adapted to form a seal with the liquid in the gutter surrounding the casing and means for securing the cover to the casing substantially as set forth.

6. Apparatus for filtering and purifying air comprising a casing divided into compartments, a plurality of hollow fibrous filtering elements in each compartment, means to force air through the compartments and hollow elements from the exterior to the interior of the elements in one compartment and the interior to the exterior of the elements in the next compartment alternately, substantially as set forth.

7. Apparatus for filtering and purifying air comprising a casing divided into compartments, a set of hollow fibrous filtering elements in the compartments, means to force air in one direction through the elements in one compartment and in an opposite direction through the elements in another compartment, and means in one or more of the compartments to sterilize the air as it passes from one set of hollow elements to another, substantially as set forth.

In testimony whereof I have signed my name to this specification in the presence of two subscribing witnesses.

JOHN ST. PATRICK MACARDLE.

Witnesses:
  WALTER J. SKERTEN,
  W. J. NORWOOD.